United States Patent Office 3,097,174
Patented July 9, 1963

3,097,174
STORAGE-STABLE CATIONIC BITUMINOUS EMULSIONS
Edward W. Mertens, El Cerrito, Calif., assignor to California Research Corporation, San Francisco, Calif., a corporation of Delaware
No Drawing. Filed Aug. 21, 1959, Ser. No. 835,191
5 Claims. (Cl. 252—311.5)

The present invention relates to oil-in-water type acidic bituminous emulsions and more particularly to acidic bituminous emulsions characterized by excellent storage stability with virtually no settlement of the bituminous phase, after being stored for a period of at least from one to two weeks, as contrasted with other acidic bituminous emulsions heretofore reported in the art.

Acidic bituminous emulsions, more commonly referred to as cationic bituminous emulsions, have made their appearance as materials suitable for road-paving construction and repair, and for other paving treatments of all kinds of surfaces, at a relatively recent date. These emulsions are prepared by emulsifying bitumen in water with the aid of cation-active (cationic) emulsifiers, such as quaternary ammonium salts, amines, heterocyclic N-bases, and the like. The main advantages of these cationic emulsions are their compatibility with acidic, siliceous types of aggregates that are unsuitable for use with the conventional basic (anionic) emulsions, and also their quicker set, i.e., a more rapid coating of the stone surface, which circumstance makes the paving work less dependent on adverse weather conditions often encountered. A further discussion in the present description of the various properties and advantages of cationic emulsions would be redundant, since they have been already amply described in the art, a particularly thorough exposition having been published by Dr. Hans Kresse in "Bitumen, Teere, Asphalte und Werwandte Stoffe," No. 7, 1956.

Despite the successes of cationic bituminous emulsions in the art of paving treatment of various road surfaces, certain shortcomings have been soon noted by their manufacturers and applicators.

Thus, when amidoamine salts, such as amidoamine hydrochlorides of stearic acid, tall oil acids, etc., are employed as the emulsifying agents to prepare these emulsions, the product of emulsification lacks mechanical strength (is unstable) and breaks down, while being transported to the construction or repair site, or while being pumped or otherwise handled prior to the actual application on the aggegate. Furthermore, the adhesion property of the emulsion is often found to be lower than that desired and to be fluctuating from one type of aggregate to another. This unpredictable behavior accordingly requires a very careful selection of the aggregate type in order to be sure that a satisfactory bond would be provided between the stone surface and the film of bitumen.

On the other hand, in using quaternary ammonium salts as the cationic emulsifiers, e.g., cetyl trimethyl ammonium bromide, the emulsions, although having as a rule satisfactory mechanical strength, stability and adhesion, are found to be definitely too viscous. To parry this last drawback and to permit ready pumping and distribution, the emulsions have to be prepared using low concentrations of bitumen, so that the actual quantities of the emulsion required for satisfactory coating of the aggregate by the bitumen become unduly high.

A particularly annoying drawback lies, however, in the poor storage stability of the cationic emulsions. While during storage a certain degree of thickening of the emulsion at the bottom of the storage tank or container is to be expected, and the emulsion can be readily restored to its normal consistency and appearance by simple stirring and pumping, it has often been observed that cationic emulsions prepared with the aid of cationic emulsifiers, such as hydrochloride or acetate salts of amines derived from tallow fatty acids, or of "Sapamines" (products of acylation of unsymmetrical dialkyl ethylene diamines with a fatty acid chloride), tend to settle out the bitumen at the bottom of the storage tank coalescing into large particles or gobs, until finally a thick mass of bitumen accumulates as a lower phase. It is impossible to restore the emulsion thus broken down to its normal state by the mere stirring and pumping. If the particles of bitumen are not too large, colloid mill treatment may sometimes be of help, but this treatment increases the costs considerably. When colloid mill treatment is no longer possible, the manufacturer or applicator has to resort to scraping out the settled asphalt which adheres to the inside of the tank, and this represents a highly annoying, laborious and costly operation, whatever be the size of the tank involved.

It has now been found that cationic oil-in-water bituminous emulsions, and in particular, cationic asphalt-in-water emulsions, characterized by an excellent storage stability at conventional storage temperatures of from about 120 to about 160° F., may be produced with the aid of effective cationic emulsifiers selected among a specific group of salts of acyclic low molecular weight aliphatic monocarboxylic acids of not more than 7 carbon atoms with particular high molecular weight amides, and employed in amounts from about 0.1 to about 2.0% by weight, based on the finished emulsion.

The organic acids employed to prepare the amides, whose salts constitute effective cationic emulsifiers in accordance with the invention, are tall oil acids, i.e., mixtures of fatty acids and rosin acids derived from waste liquor of wood-pulp manufacture. The high molecular weight amides of these tall oil acids (Swedish rosin acids) are prepared by reacting the acids with tetraethylene pentamine: (1) to form monoamides of tall oil acids, tetraethylene pentamine is reacted with tall oil acids in the mol ratio of 1:1; (2) to form diamides, the pentamine is reacted with the tall oil acids in the mol ratio of 1:2. The two kinds of amides thus have from 3 to 4 basic nitrogen atoms available for the formation of salts with the low molecular weight acylic aliphatic monocarboxylic acids, namely, formic, acetic, etc., up to 6 carbon atoms in the hydrocarbon portion of the acid.

The availability of basic nitrogen atoms depends on the choice of the final pH of the salt solution to be used for emulsifying bitumen in water. Suitable salts of low molecular weight acyclic aliphatic monocarboxylic acids include formates, acetates, propionates, butyrates, isovalerates, and the like, formates and acetates being preferred for practical applications. These monocarboxylate salts are employed as the cationic emulsifiers for bitumens in accordance with the invention in amounts which range from about 0.1 to about 2.0% by weight based on the weight of the finished bituminous emulsion.

In the following description, the monoamides formed by reacting one mol of tetraethylene pentamine with 1 mol of tall oil acids will be designated hereinafter as "N-talloyl amide of tetraethylene pentamine," while the diamides formed by reacting 1 mol of the same pentamine with 2 mols of tall oil acids will be designated as "N,N-ditalloyl amides of tetraethylene pentamine."

The aforementioned salts of mono- and ditalloyl amides of tetraethylene pentamine (or of mixtures of these amides) serve to provide satisfactory oil-in-water type cationic emulsions characterized by a satisfactory degree of adhesion to the aggregate, a low viscosity, a good mechanical strength, and, particularly, an exceptional degree of stability while in storage. Bituminous materials suitable for the preparation of these emulsions using cationic salts of talloyl amides of tetraethylene pentamine, include natural asphalts, asphalts obtained by the distillation of petroleum residues, air-blown petroleum asphalts, coal-tar, coal-tar pitch, gilsonite, etc., and, in particular, paving-grade asphalts characterized by a penetration from about 300 (and higher) to 0, and preferably from 250 to 150 (ASTM D-5).

The emulsions prepared by emulsifying any one of the aforementioned bituminous materials in water with the aid of cationic salts of talloyl amides of tetraethylene pentamine in accordance with the invention may be either rapid-setting (RS-1 and RS-2) or medium-setting, and are preferably characterized by a high enough residue (50 to 75%, and, particularly, from 55 to 68%) so as to be useful as road binders and the like materials suitable for paving purposes.

After a particular bituminous binder material has been seelcted and the monoamide or diamide of tall oil acids and tetraethylene pentamine made available, the preparation of the emulsion is carried out in a simple, straightforward manner. The following example illustrates such a preparation.

21.8 g. of talloyl amide of tetraethylene pentamine (corresponding to 0.5% by weight based on the final emulsion) is added to a 2 liter vessel containing 1300 g. of distilled water and is thoroughly dissolved in the water with the aid of a magnetic stirrer. The pH selected in this instance is 3.5, and a concentrated solution of acetic acid is added until the electrodes of a pH meter, placed in this aqueous solution, indicate a pH of 3.5. Thereupon, the solution is made up to a total of 1475 g., and the pH is finally adjusted to 3.5. The resulting aqueous phase is then added into the water cylinder of a colloid mill and is heated to 120° F. At the same time, a sufficient quantity of a 200-300 penetration asphalt is introduced into the preheated asphalt cylinder of the same colloid mill so as to provide a 65% residue in the ultimate emulsion. The mill is operated at 3,600 r.p.m., the two phases being forced into the mill head over a 30-second period, and the asphalt emulsion is discharged into 1-gallon glass jar. This jar is immediately covered, after being filled with the emulsion, and is stored in an oven overnight at 120° F. After 16 hours of overnight storage, the several properties of the emulsion, such as viscosity at 77° F. (SSF), adhesion in percent, appearance, and settlement of the asphalt phase, are determined. Following an additional storage of the emulsion for two weeks at 140° F., viscosity, appearance and asphalt settlement are again observed.

A number of cationic bituminous oil-in-water type emulsions have been prepared in a similar fashion, using a 200-300 penetration asphalt of Venezuelan origin and different concentrations of the cationic amide salt emulsifiers in accordance with the invention. These emulsions were then tested for various properties (viscosity, appearance, stability in storage, and also adhesion to the aggregate). Coarse acidic siliceous aggregate (⅜-¾″) was employed in the "stone-coating" adhesion tests.

For the purposes of contrasting and emphasizing the uniqueness of the salts of talloyl amides of tetraethylene pentamine of the invention as the emulsifiers for cationic bituminous emulsions, corresponding salts of talloyl amides of diethylene triamine have been likewise employed to prepare the emulsions, and the various properties of these latter have been observed. The adhesion was determined in all tests in accordance with the following procedure.

A wetted (2% water, based on dry aggregate) sample of coarse siliceous, hydrophilic aggregate (465 g.) was treated with a predetermined amount of the emulsion (35 g.) by mixing vigorously the emulsion and the aggregate together for about 2-3 minutes. After that, the mixing was stopped and the percentage of the aggregate surface, from which the emulsion stripped off at the end of mixing, was estimated visually.

The viscosity was determined in accordance with the recommended ASTM practice for testing emulsified asphalt (ASTM D244) in seconds Saybolt Furol at 77° F. The appearance of the emulsions was also observed visually for the formation of large gobs or "shot," skin or film formation, and settlement of the emulsion either as such (by thickening) or as a separate homogeneous asphalt phase. Particle size was determined in microns by means of a microscope.

The results of the several series of representative comparison tests are given below in Table I. In all tests, the aggregate used was a siliceous sandstone of Pennsylvania origin known in the trade as White Haven Sandstone. The finished emulsion contained: 65% by weight of an asphalt of Venezuelan origin; 0.5% of the cationic salt emulsifier; sufficient acetic acid to give a pH of 3.5; and water to make 100% by weight.

In the table, the following abbreviations are employed: Salts of N-talloyl amides of tetraethylene pentamine are designated as salts of N-talloyl amides of TEPA; salts of N-talloyl amides of diethylene triamine as salts of N-talloyl DETA; mM. refers to millimoles of the amide salt; SSF refers to seconds of Saybolt Furol scale. One gallon of the emulsion is assumed to weigh approximately 3600 grams.

*Table I.—Comparison Tests of Cationic Emulsions*

| Run No. | Emulsifier salt | Concentration of emulsifier | | pH | Predominant particle size in microns | Inspection after 16 hrs. at 120° F. | | Inspection after 2 weeks at 140° F. | |
|---|---|---|---|---|---|---|---|---|---|
| | | Percent by weight | mM./3,600 g. | | | Viscosity SSF at 77° F. | Adhesion in percent | Viscosity SSF at 77° F. | Settlement of asphalt |
| 1 | N-talloyl TEPA acetate | 0.2 | 13.8 | 5.0 | | 49 | 60 | 67 | None. |
| 2 | | 0.3 | 20.6 | 5.0 | | 60 | 80 | 75 | Do. |
| 3 | | 0.5 | 34.3 | 5.0 | | 61 | 95 | 75 | Do. |
| 4 | | 0.7 | 48.5 | 5.0 | | 58 | 90 | 70 | Do |
| 5 | | 1.0 | 68.8 | 5.0 | | 55 | 90 | 59 | Do. |
| 6 | N-talloyl DETA acetate | 0.15 | 13.8 | 4.6 | | (¹) | 5 | (¹) | (¹) |
| 7 | | 0.225 | 20.6 | 4.6 | | (¹) | 10 | (²) | Very heavy. |
| 8 | | 0.375 | 34.3 | 4.6 | | 118 | 50 | 183 | Heavy. |
| 9 | | 0.525 | 48.5 | 4.6 | | 140 | 60 | 134 | Some. |
| 10 | | 0.75 | 68.8 | 4.6 | | 155 | 90 | 177 | Do. |

¹ Emulsion broken. ² Emulsion partly broken.

The results of the comparison tests presented in Table I bring out conclusively the unique characteristic of stability in storage of the cationic bituminous emulsions prepared with the aid of the particular salts of talloyl acid amides of tetraethylene pentamine as the emulsifiers. In all test runs with these emulsions, after 2 weeks (14 days) of storage at a temperature of about 140° F., the emulsions appeared substantially unchanged, smooth or only slightly grainy in texture, with practically no formation of "shot," and with no settlement of a separate asphalt phase at the bottom of the storage vessel. The viscosity of the emulsion, when determined after two weeks in storage, did not increase inordinately as compared with the viscosity originally observed after the emulsion was prepared and left to stand overnight for 16 hours at 120° F. The average particle size of the emulsion ranged from about 4 to about 7 microns indicating the high quality of the emulsified material. Adhesion was excellent as compared with the adhesion displayed by the emulsions prepared with the aid of the emulsifying salt derived from diethylene triamine. As a matter of fact, these latter emulsions prepared from the same asphalt, using identical quantities (in millimoles per 1 gallon of the finished emulsified material) of the salt emulsifiers derived from diethylene triamine invariably possessed grainy structure, and on being stored for two weeks at 140° F., displayed separation of "shot" and heavy settlement of an asphalt phase at the bottom of the storage vessel. The viscosity of these emulsions after storage also lay outside the limits specified by ASTM.

In addition to the basic components of the cationic emulsions, i.e., bitumen, water, and the salt of talloyl acid amide derived from tetraethylene pentamine acting as the emulsifier, the emulsions of the present invention may contain conventional additives known in the art to improve certain desirable characteristics of such emulsions. These additives include, e.g., antistripping agents, thickening agents, etc., provided, of course, they do not impair the beneficial effect of the cationic salt emulsifier on the storage stability and other desirable properties of the emulsions.

It is to be understood that the foregoing description and the test data are intended solely to illustrate the invention and are not to be interpreted in limitation thereof, except as defined in the following claims.

I claim:

1. A cationic oil-in-water type bituminous emulsion, consisting essentially of from about 50 to about 75% by weight of asphalt, as the disperse bituminous phase; from about 50 to about 25% by weight of water, as the continuous aqueous phase; and, as the emulsifier for said asphalt in said water, from about 0.1 to about 2.0% by weight of a salt of a low molecular weight $C_1$-$C_7$ monocarboxylic acid and a tetraethylene pentamine amide of tall oil acids from the group consisting of monotalloyl and ditalloyl amides of tetraethylene pentamine, said amides being characterized by the presence of from 3 to 4 basic nitrogen atoms reactive with carboxylic acids and said emulsion being characterized by stability in storage at temperatures from about 120 to about 160° F. and by the absence of settlement of the asphalt, when so stored for at least two weeks.

2. A cationic bituminous emulsion as defined in claim 1, wherein the emulsifier salt is a formate of a tetraethylene pentamine monoamide of tall oil acids.

3. A cationic bituminous emulsion as defined in claim 1, wherein the emulsifier salt is a formate of a tetraethylene pentamine diamide of tall oil acids.

4. A cationic bituminous emulsion as defined in claim 1, wherein the emulsifier salt is an acetate of a tetraethylene pentamine monoamide of tall oil acids.

5. A cationic bituminous emulsion as defined in claim 1, wherein the emulsifier salt is an acetate of a tetraethylene pentamine diamide of tall oil acids.

References Cited in the file of this patent

UNITED STATES PATENTS 2,317,959 Johnson et al. _____ Apr. 27, 1943

FOREIGN PATENTS 792,648 Great Britain _____ Apr. 2, 1958
1,132,352 France _____ Nov. 5, 1956